3,591,575
PREPARATION OF DIAZONIUM COMPOUNDS
Eugene Golda, Bronx, N.Y., assignor to Polychrome Corporation, Yonkers, N.Y.
No Drawing. Filed Aug. 14, 1967, Ser. No. 660,220
Int. Cl. C07c *113/00;* C23f *11/14*
U.S. Cl. 260—141
9 Claims

ABSTRACT OF THE DISCLOSURE

A method for making a storage-stable, moisture-resistant, light-sensitive diazonium compound in dry powder form by reacting a light-sensitive, water-soluble diazo compound with a hydroxyl-containing coupling agent therefor in an aqueous medium at a pH of about 1.5 to about 7.5 substantially to avoid resinification and loss of light-sensitivity, and recovering the precipitated diazonium compound reaction product.

---

This invention relates to the making of stable diazonium compounds, and more particularly to the preparation of storage-stable, light-sensitive reaction products of water-soluble diazo-aromatic compounds and hydroxyl-containing aromatic compounds.

Light-sensitive diazo compounds, which have a variety of uses, such as for making dyes and photographic and lithographic compositions, are known generally to be unstable to reactions catalyzed or otherwise promoted by moisture and heat. Such compounds tend to undergo so-called "dark reactions," i.e., oxidation reactions even without exposure to light, and thus cannot be stored for practical periods of time, for example, several months. Special precautions therefore usually are taken with diazonium materials, for example, the use of special air-tight containers, refrigeration, and dark or opaque wrappers. Such precautions, however, are expensive, add to the overall cost of the diazo material and do not ensure prolonged storability or "shelf-life."

Accordingly, it is an object of this invention to provide improved diazonium compounds. It is also an object of this invention to provide a method of making improved diazonium compounds. A further object of this invention is to provide diazonium compounds that are light-sensitive but which are moisture-resistant and are comparatively free from dark reaction. Another object of this invention is to provide diazonium compounds that are storage-stable for long periods of time. These and other objects of this invention will be in part discussed and in part apparent in the following more detailed disclosure of the invention.

Broadly, the objects of this invention can be achieved, and the light-sensitive, moisture-resistant, storage-stable diazonium compounds can be prepared, by reacting a water-soluble, light-sensitive diazo compound with a coupling agent in an aqueous medium under conditions such that resinification and loss of light-sensitivity, both of which are to be expected during the reaction, are substantially avoided. Thus, a water-insoluble, moisture-resistant reaction product is formed which possesses substantially the same light-sensitive character as the starting diazo compound. The reaction products can be obtained in a dry, powdered form and are comparatively stable for long periods of time, e.g., several months, without special packaging or other precautions against heat and moisture. Thereafter the reaction products can be used for a variety of purposes, such as being dissolved in a solvent and coated onto substrates to make photographic or lithographic products.

More specifically, it has been found that water-soluble, light-sensitive diazo-arylamine compounds, particularly diazo-diphenylamines, can be reacted in an aqueous medium with hydroxyl-containing aromatic coupling agents at a pH between about 1.5 and about 7.5, preferably in the acidic range, and that the reaction product thus formed, which is water-insoluble, quickly precipitates out of the reaction medium. Several advantages over known methods of preparing diazo compounds or resins are provided by the instant method. In such known methods, it is common to precipitate out the diazo material as a salt, for example, as a zinc chloride double salt or as a sulfate. In addition to the precipitant salt, which usually must be used in excess quantities, various solvents, such as lower alcohols, must be used to obtain or purify the product. Such solvents and salts are then discarded as the cost of their recovery or regeneration is prohibitive. By contrast, the method of this invention avoids the need to use expensive solvents and large amounts of salts. Also, the diazonium compound and the coupling agent can be used in substantially equimolecular proportions, impurities can be washed out with water, and drying of the diazo reaction product is quick and efficient because it is inherently hydrophobic. The diazo can be used in solution concentrations of up to about 25% by weight preferably between about 5% and about 20%.

Important examples of diazonium compounds suitable for use in this invention are diazo-arylamines, particularly of the diphenylamine type in which the aromatic nuclei and amino-nitrogen can be substituted, and condensation products of such diazo-arylamines with compounds containing reactive carbonyl groups, such as aldehydes and ketones. A particularly suitable, and therefore preferred, light-sensitive compound is the condensation product of para-diazo-diphenylamine and formaldehyde, for example, para-diazo-diphenylamine sulfate and either formaldehyde zinc chloride or para-formaldehyde. Such condensation products are disclosed in U.S. Pats. No. 2,922,715 and No. 2,946,683.

The number of coupling agents useful for the purposes of this invention is large. They are best described and their nature understood by a recitation of their main characteristic, i.e., an ability to react with the diazonium compound under reaction conditions that will not cause resinification and loss of light sensitivity. Coupling agents reacting with diazo in an acid medium, e.g., at a pH of between about 1.5 and about 7.5, are found to be especially advantageous for the practice of the instant invention. The coupling agent can be used in solution concentrations of up to about 25% by weight, preferably between about 5% and about 20%. Water-insoluble coupling agents can be dissolved in organic solvents miscible with water, for example, methanol, ethanol, isopropanol, corresponding glycols, ethers, ketones and the like, depending upon the coupling agents, in substantially the same amounts.

Among the coupling agents that are suitable for use in the reaction of the present invention are hydroxy-containing aromatic compounds, for example, hydroxy-benzophenones, diphenolic acids such as 4,4-bis(4-hydroxyphenyl)-pentanoic acid, resorcinol, diresorcinol, 1-naphthol-3-sulfonamide, 2-naphthol-3,6-disulfonic acid disodium salt and N-alkyl-5-sulfonanthranilic acids such as the methyl and ethyl compounds. These materials may have as substituents aldehyde, carboxyl or sulfonic groups. Groups tending to impart water-solubility are favored whereas those tending to impart water-insolubility are less desirable unless their effect is counter-balanced. In fact, very little water solubility, perhaps 0.05 percent, is required of the coupling agents at normal reaction temperatures. Hydroxy-benzophenones especially are suitable for the present invention, particularly 2,4-dihydroxy-benzophenone, 2 - hydroxy-4-methoxy-benzophenone, 2,2' - dihydroxy-4,4'-dimethoxy-benzophenone, 2,2',4,4' - tetrahydroxy-benzophenone, sodium 2,2' - dihydroxy-4,4'-dimethoxy - 5 - sulfobenzophenone, 2-hydroxy-4-methoxy-benzophenone - 5 - sulfonic acid, the trihydrate of the last-named acid, and mixtures of such compounds. 2,2', 4,4'-tetrahydroxy - benzophenone presently is preferred among those compounds.

To point out more fully the nature of the present invention, the following examples are set forth to illustrate specific embodiments of the light-sensitive, moisture-resistant diazonium reaction products of this invention.

EXAMPLE 1

A condensation product of p-diazo-diphenylamine sulfate and paraformaldehyde was prepared by reacting 10 parts and 1 part by weight, respectively, of them in 40 parts of 96% Baumé sulfuric acid. The diazo reaction mass was then diluted with ice to about 10% condensation product strength, and a 5% by weight solution if 2,2',4,4'-tetrahydroxy-benzophenone in methanol that had been acidified to a pH of 4 with sulfuric acid was added to the cooled reaction mass to provide equimolar amounts of the diazo and the benzophenone. A yellow, water-insoluble precipitate formed immediately and was separated from the aqueous medium. The solid material, which comprised substantialy the total amount of the diazo and the benzophenone, was washed with water and dried.

To test the light-sensitivity and stability of the reaction product, it was dissolved in a solvent of 60% by weight isopropanol and 40% water, and thinly coated onto several sheets of aluminum. For comparison, other aluminum sheets were thinly coated in aqueous solution with the condensation product, i.e., the diazo which had not been reacted with the hydroxyl-containing aromatic coupling agent. Initially, a sheet with each coating was exposed to light, and they were found to have the same sensitivity of 5 on a 21 step Stouffer sensitivity guide. Another sheet with each coating was placed in a humidity chamber at 80° F. and 80% relative humidity for 3 hours. The light-sensitivity of the reaction product coated on the sheet remained the same and the unexposed are on the sheet was clean, i.e., free of fogging caused by untoward reaction. The light-sensitivity of the condensation product coated on the other sheet, however, had increased by about 100%, i.e., from a value of 5 to 7, which indicated that the diazonium compound had degraded. Also, the unexposed area on the sheet was fogged, indicating that heat and humidity had affected the coating.

EXAMPLE 2

One mol of a diazo condensation product was prepared as described in Example 1 and diluted with ice. One mol of diphenolic acid in a 5% water silution having a pH of below 7.5 was added to the reaction medium. An insoluble precipitate quickly formed which was separated from the reaction medium, washed with water and dried. The reaction product was thinly coated onto aluminum sheets and the light-sensitivity of one sheet was determined as 5 on the Stouffer guide. Another coated sheet was placed in the humidity chamber for 3 hours, and the light-sensitivity of its reaction product coating was found to be unchanged. Also, the unexposed area of the sheet was free of fogging.

It is of course to be understood that the foregoing examples are illustrative only and that numerous changes can be made by persons skilled in the art of the ingredients, proportions and conditions set forth therein without departing from the scope of the invention as defined in the claims appended hereto.

I claim:
1. A method for the preparation of a storage-stable, moisture-resistant, light-sensitive diazonium compound which comprises reacting (1) a water-soluble, light-sensitive diazonium compound selected from the group consisting of para-diazo-diphenylamine and the condensation product of para-diazo-diphenylamine with formaldehyde, formaldehyde zinc chloride or paraformaldehyde with (2) a hydroxyl-containing aromatic coupling agent selected from the group consisting of hydroxy-benzophenone which may be substituted by an additional hydroxy group or up to two lower alkoxy groups, diphenolic acid, resorcinol, naphthol-sulfonamide, naphtholsulfonic acid and sulfonanthranilic acid in an inert aqueous reaction medium having a pH between about 1.5 and about 7.5 substantially to avoid resinification of the reaction product and loss of light-sensitivity of the diazonium group, forming said diazonium compound as a water-insoluble precipitate, and separating said precipitate from the reaction medium in a dry powder form.

2. A method for the preparation of a diazonium compound according to claim 1 wherein said hydroxyl-containing aromatic coupling agent is:
2,4-dihydroxy-benzophenone;
2-hydroxy-4-methoxy-benzophenone;
2,2'-dihydroxy-4,4'-dimethoxy-benzophenone;
2,2',4,4'-tetrahydroxy-benzophenone;
sodium 2,2'-dihydroxy-4,4'-dimethoxy-5-sulfobenzophenone;
2-hydroxy-4-methoxy-benzophenone-5-sulfonic acid;
a trihydrate of 2 - hydroxy-4-methoxy-benzophenone-5-sulfonic acid.

3. A method for the preparation of a diazonium compound according to claim 1 wherein said hydroxyl-containing aromatic coupling agent is 2,2',4,4'-tetrahydroxy-benzophenone.

4. A method for the preparation of a diazonium compound according to claim 1 wherein the components (1) and (2) are reacted in substantially equimolecular amounts.

5. A method for the preparation of a diazonium compound according to claim 1 wherein the pH of said aqueous reaction medium is less than 7.0.

6. A method for the preparation of a diazonium compound according to claim 1 wherein the component (1) is the condensation product of para-diazo-diphenylamine sulfate and formaldehyde zinc chloride.

7. A method for the preparation of a diazonium compound according to claim 1 wherein the component (1) is the condensation product of para-diazo-diphenylamine sulfate and paraformaldehyde.

8. A method for the preparation of a diazonium compound according to claim 1 wherein the components (1) and (2) each is present in the reaction medium in an amount up to about 25% by weight.

9. A method for the preparation of a diazonium compound according to claim 1 wherein the components (1) and (2) each is present in the reaction medium in an amount between about 5% and about 20% by weight.

References Cited
UNITED STATES PATENTS

| | | | |
|---|---|---|---|
| 2,773,864 | 12/1956 | Williams et al. | 260—181 |
| 3,163,633 | 12/1964 | Steppan et al. | 260—141 |

CHARLES B. PARKER, Primary Examiner

D. M. PAPUGA, Assistant Examiner

U.S. Cl. X.R.
117—127